United States Patent
Jung

(10) Patent No.: US 9,702,704 B2
(45) Date of Patent: Jul. 11, 2017

(54) VEHICLE LOCATION TRACKING DEVICE AND METHOD

(71) Applicant: HYUNDAI MOBIS CO., LTD., Seoul (KR)

(72) Inventor: Eun Tai Jung, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 0 days.

(21) Appl. No.: 14/506,913

(22) Filed: Oct. 6, 2014

(65) Prior Publication Data

US 2015/0120188 A1    Apr. 30, 2015

(30) Foreign Application Priority Data

Oct. 30, 2013 (KR) .......................... 10-2013-0130619

(51) Int. Cl.
  *G01C 21/20* (2006.01)
  *G01S 19/14* (2010.01)
  *G08G 1/00* (2006.01)

(52) U.S. Cl.
  CPC .............. *G01C 21/20* (2013.01); *G01S 19/14* (2013.01); *G08G 1/20* (2013.01)

(58) Field of Classification Search
  CPC ........ G01C 21/20; G01C 21/26; G01C 21/28; G01S 19/14; G08G 1/20; G08G 1/205
  See application file for complete search history.

(56) References Cited

U.S. PATENT DOCUMENTS

| | | | | |
|---|---|---|---|---|
| 6,313,758 B1* | 11/2001 | Kobayashi | ............ | G08G 1/162 340/436 |
| 6,965,816 B2* | 11/2005 | Walker | .................... | B64C 13/20 244/189 |
| 2002/0188400 A1* | 12/2002 | Sato et al. | ..................... | 701/212 |
| 2004/0148090 A1 | 7/2004 | Melen | | |
| 2004/0230373 A1* | 11/2004 | Tzamaloukas | ................ | 701/208 |
| 2007/0027614 A1* | 2/2007 | Reeser et al. | ................. | 701/200 |
| 2007/0078595 A1* | 4/2007 | Song | ............................. | 701/208 |
| 2008/0129548 A1* | 6/2008 | Firestone | ...................... | 340/993 |

(Continued)

FOREIGN PATENT DOCUMENTS

DE   10 2004 020 678 A1   11/2005
EP       2 079 066 A1    7/2009

(Continued)

*Primary Examiner* — Adam Tissot
*Assistant Examiner* — Tamara Weber
(74) *Attorney, Agent, or Firm* — NSIP Law

(57) ABSTRACT

A vehicle location tracking device may include: a GPS (Global Positioning System) module configured to detect location information and time information of an owner vehicle using a GPS satellite; a transmitter/receiver configured to transmit/receive a tracking message required for vehicle tracking; a main processor configured to generate a tracking message of the owner vehicle using the location information and time information of the owner vehicle, detected through the GPS module, transmit the tracking message of the owner vehicle through the transmitter/receiver, analyze a tracking message of a tracked vehicle, received through the transmitter/receiver, and generate tracking information on the tracked vehicle; and a navigation terminal configured to output the tracking information on the tracked vehicle, generated through the main processor.

14 Claims, 4 Drawing Sheets

(56) References Cited

U.S. PATENT DOCUMENTS

| | | | |
|---|---|---|---|
| 2010/0020169 A1* | 1/2010 | Jang | G01C 21/36 348/115 |
| 2013/0093604 A1* | 4/2013 | Highstrom et al. | 340/990 |
| 2013/0116917 A1* | 5/2013 | Boehm | H04W 4/046 701/118 |
| 2013/0166096 A1* | 6/2013 | Jotanovic | 701/1 |
| 2013/0325940 A1* | 12/2013 | Foti | 709/204 |
| 2014/0012494 A1* | 1/2014 | Cudak | G01C 21/3415 701/412 |
| 2014/0302774 A1* | 10/2014 | Burke et al. | 455/3.05 |

FOREIGN PATENT DOCUMENTS

| | | |
|---|---|---|
| EP | 2 423 900 A1 | 2/2012 |
| KR | 10-2009-0055680 A | 6/2009 |

\* cited by examiner

VEHICLE LOCATION TRACKING DEVICE AND METHOD

CROSS-REFERENCES TO RELATED APPLICATIONS

The present application claims priority to Korean application number 10-2013-0130619, filed on Oct. 30, 2013, which is incorporated by reference in its entirety.

BACKGROUND OF THE INVENTION

The present invention relates to a vehicle location tracking device and method, and more particularly, to a vehicle location tracking device and method capable of perceiving the locations of vehicles by sharing location information between the vehicles.

A navigation system detects location information of a vehicle through GPS (Global Positioning System) information received from a GPS satellite, matches the detected location information to map information, and provides the current location of the vehicle. Furthermore, the navigation system provides various pieces of information required for operation to the vehicle's driver, the various pieces of information including the traveling direction of the vehicle, a distance to the destination, the current speed of the vehicle, an optimal path to the destination and the like.

Recently, the navigation system has been used to provide a tracking service to a vehicle's passenger. The tracking service refers to a service which assists a plurality of vehicles to exchange and share location information or path information therebetween, when the plurality of vehicles travel to the same destination.

In the conventional tracking service, however, a service center for integrally controlling the location information must be established to enable the respective vehicles to exchange the location information with each other. Moreover, a communication network of a mobile communication company, such as CDMA (Code Division Multiple Access), must be used to share the location information. In this case, users must pay for the use of the communication network. Furthermore, in order to use the conventional tracking service, each of the users must go through authentication to use the service.

The related art of the present invention is disclosed in Korean Patent Laid-open Publication No. 10-2009-0055680 published on Jun. 3, 2009 and entitled "Common path finding system and method".

SUMMARY OF THE INVENTION

An embodiment of the present invention is directed to a vehicle location tracking device and method which directly transmits and receives location information between vehicles through a wave communication method such that each of the vehicles outputs tracking information on the tracked vehicle through a navigation device.

Another embodiment of the present invention is directed to a vehicle location tracking device and method which is capable of reducing the fee for the use of a mobile communication network and a tracking service operating cost and improving the utilization rate of the tracking service.

In one embodiment, a vehicle location tracking device may include: a GPS (Global Positioning System) module configured to detect location information and time information of an owner vehicle using a GPS satellite; a transmitter/receiver configured to transmit/receive a tracking message required for vehicle tracking; a main processor configured to generate a tracking message of the owner vehicle using the location information and time information of the owner vehicle, detected through the GPS module, transmit the tracking message of the owner vehicle through the transmitter/receiver, analyze a tracking message of a tracked vehicle, received through the transmitter/receiver, and generate tracking information on the tracked vehicle; and a navigation terminal configured to output the tracking information on the tracked vehicle, generated through the main processor.

The transmitter/receiver may emit the tracking message according to a wave communication method.

The main processor may generate the tracking message of the owner vehicle by combining the location information and time information of the owner vehicle and a tracking message ID.

The main processor may generate the tracking message ID by combining preset tracking identification information, tracking service information indicating a tracking service, and vehicle identification information of the owner vehicle.

The tracking information on the tracked vehicle may include the location information of the tracked vehicle, the time information of the tracked vehicle, and vehicle identification information of the tracked vehicle.

The navigation terminal may output the tracking information on the tracked vehicle, generated through the main processor, according to a screen division method.

The navigation terminal may display the tracking information on the tracked vehicle, generated through the main processor, on a pop-up window.

The navigation terminal may output the tracking information on the tracked vehicle, generated through the main processor, on a traveling path of the owner vehicle.

The main processor may analyze the tracking message of the tracked vehicle, and output a notification message for a preset event, when determining that the preset event occurred.

The event may include one or more of the case in which a distance between the owner vehicle and the tracked vehicle is equal to or more than a preset distance and the case in which the tracked vehicle deviates from a preset traveling path.

In accordance with the embodiment of the present invention, the location information may be directly transmitted/received between vehicles through the wave communication method, such that each of the vehicles outputs tracking information on the tracked vehicle.

Furthermore, the wave communication method may be used to reduce the fee for the use of a mobile communication network and the tracking service operating cost, thereby increasing the utilization rate of the tracking service.

DESCRIPTION OF SPECIFIC EMBODIMENTS

Embodiments of the invention will hereinafter be described in detail with reference to the accompanying drawings. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
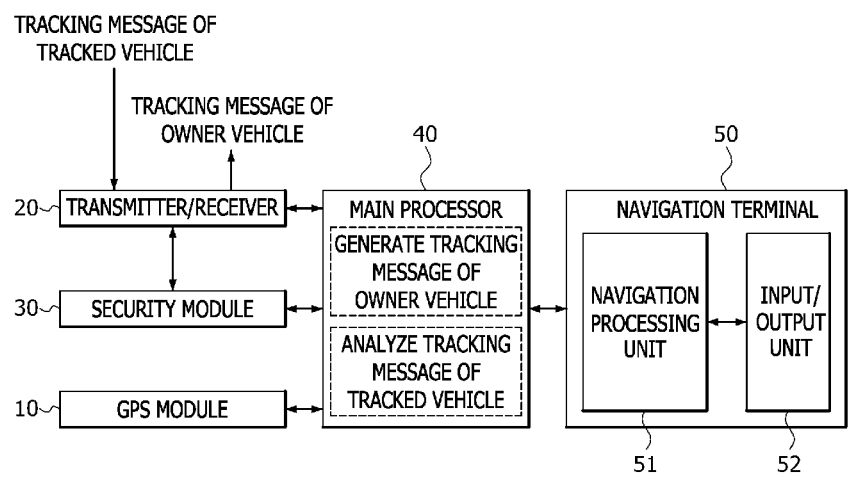
FIG. 1 is a configuration diagram of a vehicle location tracking device in accordance with an embodiment of the present invention.
Figure 2:
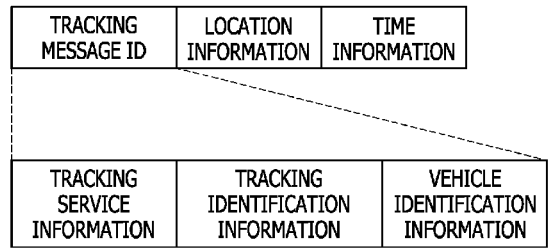
FIG. 2 is a configuration diagram of a tracking message in accordance with the embodiment of the present invention.
Figure 3:
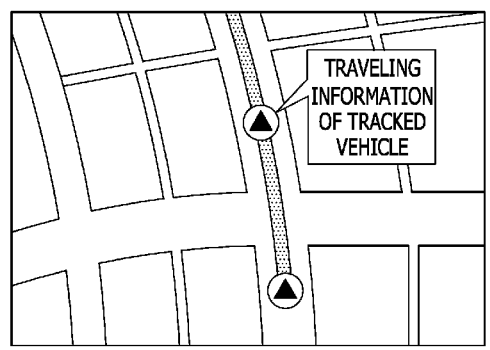
FIG. 3 is a diagram illustrating an example of a screen outputted through a navigation terminal in accordance with the embodiment of the present invention.
Figure 4:
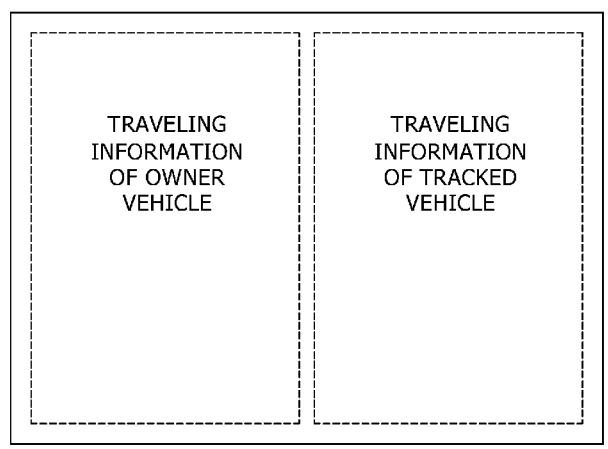
FIG. 4 is a diagram illustrating another example of the screen outputted through the navigation terminal in accordance with the embodiment of the present invention.
Figure 5:
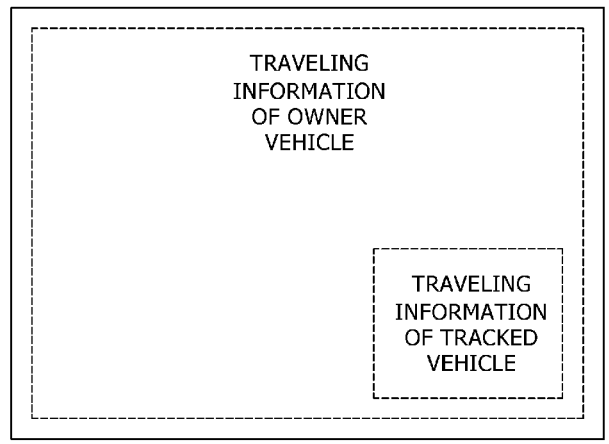
FIG. 5 is a diagram illustrating still another example of the screen outputted through the navigation terminal in accordance with the embodiment of the present invention.

FIG. 1 is a configuration diagram of a vehicle location tracking device in accordance with an embodiment of the present invention. FIG. 2 is a configuration diagram of a tracking message in accordance with the embodiment of the present invention. FIG. 3 is a diagram illustrating an example of a screen outputted through a navigation terminal in accordance with the embodiment of the present invention. FIG. 4 is a diagram illustrating another example of the screen outputted through the navigation terminal in accordance with the embodiment of the present invention. FIG. 5 is a diagram illustrating still another example of the screen outputted through the navigation terminal in accordance with the embodiment of the present invention.

Referring to FIG. 1, the vehicle location tracking device in accordance with the embodiment of the present invention may be provided for each vehicle, and include a GPS (Global Positioning System) module 10, a transmitter/receiver 20, a security module 30, a main processor 40, and a navigation terminal 50.

In the present specification, a vehicle corresponding to a tracked target may be defined as a tracked vehicle, and a vehicle which receives a tracking message from the tracked vehicle and outputs tracking information on the tracked vehicle may be defined as an owner vehicle, for convenience of description.

Furthermore, since each vehicle receives a tracking message from a tracked vehicle, the vehicle may serve as an owner vehicle. Furthermore, since the vehicle generates a tracking message through location information and time information thereof and provides the generated tracking message to other vehicles, the vehicle may serve as a tracked vehicle with respect to other vehicles.

The GPS module 10 may detect location information and time information of an owner vehicle. The GPS module 10 may measure distance information from three or more satellites and detect time information at which the distance information is measured. Then, the GPS module 10 may apply a triangulation method to the measured distance information so as to detect three-dimensional (3D) location information based on the latitude, longitude, and altitude.

The transmitter/receiver 20 may perform wireless communication between vehicles through a wave communication method such as V2V (Vehicle-to-Vehicle) communication, and receive a tracking message from the tracked vehicle or emit a tracking message generated through the main processor 40.

The security module 30 may decode the tracking message of the tracked vehicle, received through the transmitter/receiver 20, or encode the tracking message generated through the main processor 40 and input the encoded tracking message to the main processor 40.

Furthermore, the security module 30 may register tracking identification information therein, which will be described below, and transmit the tracking identification information to the transmitter/receiver 20 of another vehicle which allows tracking therebetween. Thus, the same tracking identification information may be registered in the vehicles using the tracking service.

The main processor 40 may generate a tracking message required for vehicle tracking using the location information and time information of the owner vehicle, detected through the GPS module 10, and encode the generated tracking message through the security module 30. Then, the main processor 40 may emit the tracking message of the owner vehicle, encoded through the security module 30, through the transmitter/receiver 20.

Furthermore, when the tracking message of the tracked vehicle, received through the transmitter/receiver 20, is decoded by the security module 30, the main processor 20 may analyze the tracking message to determine whether the tracking message is a tracking message of the tracked vehicle. When determining that the tracking message is a tracking message of the tracked vehicle, the transmitter/receiver 20 may generate tracking information on the tracked vehicle, and then input the generated tracking information to the navigation terminal 50.

The tracking information on the tracked vehicle may include the location information and time information of the tracked vehicle and the vehicle identification information of the tracked vehicle.

Referring to FIG. 2, the main processor 40 may generate a tracking message by combining a tracking message ID and location information and time information of the owner vehicle.

The tracking message ID may indicate information through which a plurality of vehicles using the tracking service can identify each other. The main processor 40 may generate the tracking message ID by combining the tracking identification information received from the security module 30, tracking service information indicating the tracking service, and vehicle identification information of the owner vehicle.

The tracking identification information may be shared by vehicles which allow tracking, registered in the security module 30 provided in each of the vehicles, and arbitrarily generated or arbitrarily set by a user. When the tracking identification information is registered in the security module 30 provided in any one of the vehicles which allow tracking, the security module 30 may transmit the tracking identification information to the transmitters/receivers 20 of the other vehicles through the transmitter/receiver 20. At this time, the security modules 30 of the other vehicles may register the corresponding tracking identification information received through the transmitters/receivers 20. Thus, the security modules 30 of the respective vehicles which allow tracking may share the same tracking identification information therebetween.

The vehicle identification information may include a vehicle number or the like.

Furthermore, the tracking service information may include information indicating whether the corresponding vehicle uses the tracking service.

Thus, when the message is received from the transmitter/receiver 20 and decoded through the security module 30, the main processor 40 may check the tracking service information so as to determine whether the message is a tracking message transmitted/received between vehicles using the tracking service.

When determining that the message is a tracking message, the main processor 40 may check the tracking identification information so as to determine whether the tracking identification information is equal to previously stored tracking identification information. When the tracking identification information coincides with the previously stored tracking identification information, the main processor 40 may generate tracking information on the tracked vehicle, such as vehicle identification information, location information, and time information.

The navigation terminal 50 may output traveling information of the owner vehicle, and output the tracking information on the tracked vehicle, received from the main processor 40.

The navigation terminal 50 may include a navigation processing unit 51 and an input/output unit 52.

The input/output unit 52 may receive various control commands for starting and ending the tracking service as well as control commands for unique functions and operations of the navigation terminal 50, and output the traveling information of the owner vehicle and the tracking information on the tracked vehicle. The input/output unit 52 may include a touch screen.

The navigation processing unit 51 may determine the current location of the owner vehicle, based on a navigation message and the traveling state of the owner vehicle. Furthermore, the navigation processing unit 51 may match the determined current location of the owner vehicle to map data, and output the traveling information of the owner vehicle and the tracking information on the tracked information, received from the main processing unit 40, through the input/output unit 52.

In particular, the navigation processing unit 51 may output the traveling information of the owner vehicle and the tracking information on the tracked vehicle in various manners through the input/output unit 52. Furthermore, the navigation processing unit 51 may determine whether a preset event occurs, based on the tracking information on the tracked vehicle, the traveling information of the owner vehicle, and a traveling path to a preset destination, and output a notification message for the corresponding event according to the determination result.

The operation of the navigation terminal 50 will be described with reference to FIGS. 3 to 5.

FIG. 3 illustrates an example of a screen which outputs traveling information of a tracked vehicle on a traveling path of the owner vehicle. For example, when the owner vehicle and the tracked vehicle receive information on path guide to the same destination, the location information or the like of the tracked vehicle may be displayed on the traveling path of the owner vehicle.

During this process, the navigation terminal 50 may calculate a distance between the tracked vehicle and the owner vehicle, based on the location information of the tracked vehicle and the location information of the owner vehicle. When the distance between the tracked vehicle and the owner vehicle becomes equal to or more than a preset distance, the navigation terminal 50 may output a notification message to notify that the distance from the tracked vehicle increases.

Furthermore, the navigation terminal 50 may analyze the location information of the tracked vehicle. When the tracked vehicle deviates from the preset traveling path, the navigation terminal 50 may output a notification message to notify that the tracked vehicle deviated from the preset traveling path.

The navigation terminal 50 may output the notification message in various manners, using one or more of an image, a text, and a voice.

FIG. 4 illustrates an example in which the traveling information of the owner vehicle and the tracking information on the tracked vehicle are outputted on divided screens of the input/output unit 52, respectively. Referring to FIG. 4, the traveling information of the owner vehicle may be outputted on the left side of the screen, and the tracking information on the tracked vehicle may be outputted on the right side of the screen. In this case, the navigation terminal 50 may provide the traveling information of the owner vehicle and the tracking information on the tracked vehicle in the same form as a typical navigation screen.

FIG. 5 illustrates an example in which a pop-up window is formed within a screen for providing the traveling information of the owner vehicle and the tracking information on the tracked vehicle is outputted on this pop-up window. Referring to FIG. 5, when the tracking information on the tracked vehicle is outputted on the pop-up window, the navigation terminal 50 may provide only the location information and the vehicle identification information of the tracked vehicle, depending on the size of the pop-up window.

Hereafter, the operation of the vehicle location tracking device in accordance with the embodiment of the present invention will be described in detail with reference to FIGS. 6 and 7.

Figure 6:
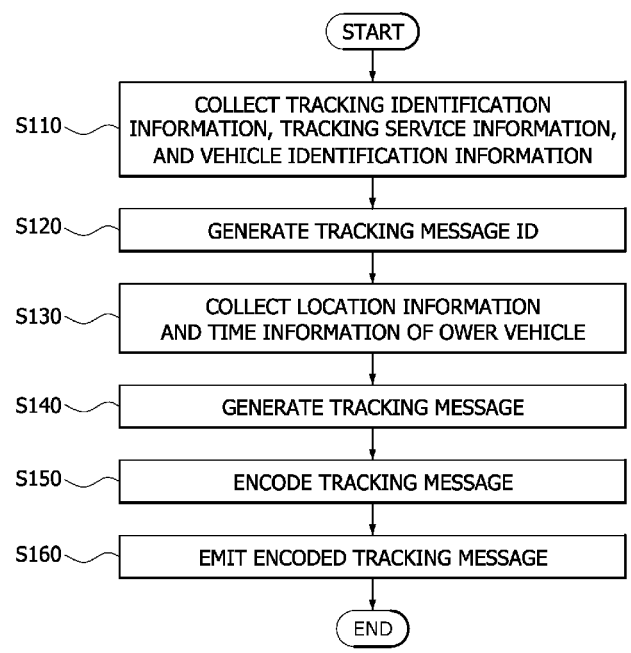
FIG. 6 is a flowchart illustrating a tracking message emission process of the vehicle location tracking device in accordance with the embodiment of the present invention.

FIG. 6 is a flowchart illustrating a tracking message emission process of the vehicle location tracking device in accordance with the embodiment of the present invention. FIG. 7 is a flowchart illustrating a tracking information output process of the vehicle location tracking device in accordance with the embodiment of the present invention.

Referring to FIG. 6, the main processor 40 may collect tracking identification information which is previously registered in the security module 30, tracking service information, and vehicle identification information, at step S110, and combine the tracking identification information, the tracking service information, and the vehicle identification information to generate a tracking message ID at step S120.

When generating the tracking message ID, the main processor 40 may receive location information and time information of the owner vehicle from the GPS module 10 at step S130, and combine the location information and the time information of the owner vehicle with the tracking message ID so as to generate a tracking message at step S140.

When generating the tracking message, the main processor 40 may input the tracking message to the security module 30, and the security module 30 may encode the tracking message at step S150.

When the tracking message is encoded by the security module 30, the main processor 40 may emit the encoded tracking message through the transmitter/receiver 20 at step S160.

Figure 7:
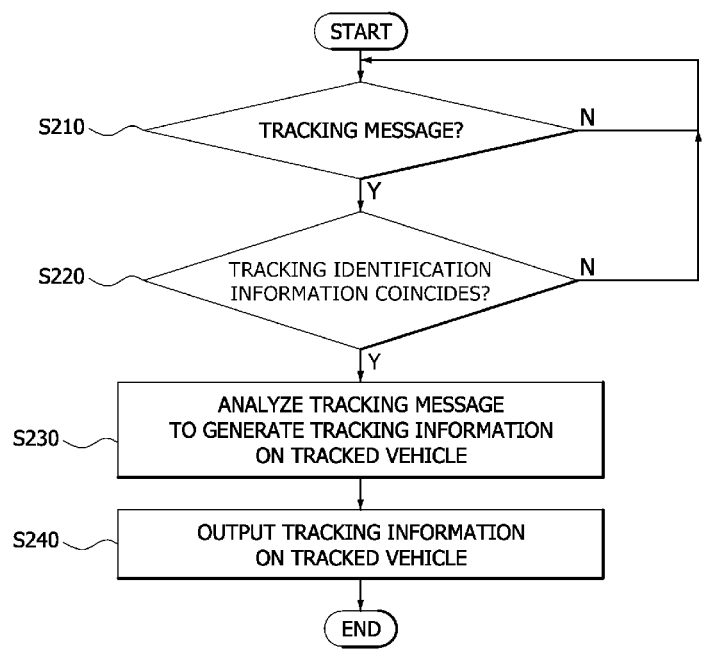
FIG. 7 is a flowchart illustrating a tracking information output process of the vehicle location tracking device in accordance with the embodiment of the present invention.

As illustrated in FIG. 7, the transmitter/receiver 20 may receive a message from an external vehicle or the like, and the security module 30 may decode the message received through the transmitter/receiver 20.

The main processor 40 may check whether tracking service information exists in the message, and determine whether the corresponding message is a tracking message, at step S210. At this time, when the tracking service information is included in the message, the main processor 40 may determine that the corresponding message is a tracking message.

When it is determined at step S210 that the corresponding message is a tracking message, the main processor 40 may extract tracking identification information within the tracking message, compare the extracted tracking identification information to previously stored tracking identification information so as to determine whether the extracted tracking identification information is equal to the previously stored tracking identification information, at step S220.

When it is determined at step S220 that the extracted tracking identification information is equal to the previously stored tracking identification information, the main processor 40 may analyze the tracking message and generate tracking information on the tracked vehicle, at step S230.

The main processor 40 may input the generated tracking information to the navigation terminal 50, and the navigation processing unit 51 of the navigation terminal 50 may output the tracking information inputted from the main processor 40 through the input/output unit 52 according to any one of the methods of FIGS. 3 to 5, at step S240. When a preset event occurs, the main processor 40 may output a notification message for the event through the navigation terminal 50. The event may include one or more of the case in which the distance between the owner vehicle and the tracked vehicle is equal to or more than a preset distance and the case in which the tracked vehicle deviates from a preset traveling path.

In accordance with the embodiment of the present invention, the location information may be directly transmitted/received between vehicles through the wave communication method, such that each of the vehicles outputs tracking information on the tracked vehicle. Furthermore, the wave communication method may be used to reduce the fee for the use of a mobile communication network and the tracking service operating cost, thereby increasing the utilization rate of the tracking service.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A vehicle location tracking device comprising tracking components configured to be disposed within an owner vehicle, the tracking components comprising:
    a GPS (Global Positioning System) module configured to detect location information and time information of the owner vehicle through a GPS satellite;
    a transmitter/receiver configured to transmit/receive a tracking message comprising tracking service information indicating registration with a tracking service;
    a main processor configured to:
        generate a tracking message of the owner vehicle using the location information and time information of the owner vehicle,
        transmit the tracking message of the owner vehicle through the transmitter/receiver,
        receive and analyze a tracking message of a tracked vehicle, and
        generate tracking information on the tracked vehicle in response to the tracking message of the tracked vehicle comprising tracking identification information equal to previously stored tracking identification information of the tracked vehicle previously stored in the vehicle location tracking device; and
    a navigation terminal configured to output the tracking information on the tracked vehicle,
    wherein the main processor is configured to analyze the tracking message of the tracked vehicle, and is configured to output a notification message for a preset event, in response to determining that the preset event occurred, and
    wherein the event comprises at least one of a distance between the owner vehicle and the tracked vehicle being equal to or more than a preset distance or the tracked vehicle deviating from a preset traveling path.

2. The vehicle location tracking device of claim 1, wherein the transmitter of the owner vehicle is configured to emit the tracking message according to a wave communication method.

3. The vehicle location tracking device of claim 1, wherein the main processor is configured to generate the tracking message of the owner vehicle by combining the location information and time information of the owner vehicle and a tracking message ID.

4. The vehicle location tracking device of claim 3, wherein the main processor is configured to generate the tracking message ID by combining the tracking identification information of the tracked vehicle, the tracking service information indicating the tracking service, and vehicle identification information of the owner vehicle.

5. The vehicle location tracking device of claim 1, wherein the tracking information on the tracked vehicle comprises the location information of the tracked vehicle, the time information of the tracked vehicle, and vehicle identification information of the tracked vehicle.

6. The vehicle location tracking device of claim 1, wherein the navigation terminal is configured to output the tracking information on the tracked vehicle according to a screen division method.

7. The vehicle location tracking device of claim 1, wherein the navigation terminal is configured to display the tracking information on the tracked vehicle on a screen of the navigation terminal in a pop-up window format.

8. The vehicle location tracking device of claim 1, wherein the navigation terminal is configured to output the tracking information on the tracked vehicle relative to a traveling path of the owner vehicle.

9. The vehicle location tracking device of claim 1, wherein the owner vehicle comprises a tracked vehicle.

10. The vehicle location tracking device of claim 1, wherein the transmitter/receiver is configured to transmit, directly by peer-to-peer communication, the tracking message of the owner vehicle to the tracked vehicle or another vehicle.

11. The vehicle location tracking device of claim 10, wherein the transmitter/receiver is configured to receive, directly by peer-to-peer communication, the tracking message of the tracked vehicle from the tracked vehicle.

12. A vehicle location tracking method comprising:
    receiving, by a main processor of an owner vehicle, a message from a tracked vehicle;

determining, by the main processor, whether the corresponding message is a tracking message, based on whether the message comprises tracking service information;

in response to the message being a tracking message, comparing, by the main processor, tracking identification information within the tracking message to previously stored tracking identification information of the tracked vehicle so as to determine whether the tracking identification information included in the tracking message is equal to the previously stored tracking identification information of the tracked vehicle previously stored in a vehicle location tracking device of the owner vehicle;

in response to the tracking identification information within the tracking message being equal to the previously stored tracking identification information of the tracked vehicle, generating, by the main processor, tracking information on the tracked vehicle, based on the tracking message; and outputting, by the main processor, the tracking information on the tracked vehicle through a terminal, wherein the outputting of the tracking information on the tracked vehicle comprises outputting a notification message for a preset event through the terminal, in response to the preset event occurring, and the event comprises at least one of a distance between the owner vehicle and the tracked vehicle being equal to or more than a preset distance or the tracked vehicle deviating from a preset traveling path.

13. The vehicle location tracking method of claim 12, wherein the tracking message further comprises location information and time information of the corresponding vehicle.

14. The vehicle location tracking method of claim 12, wherein the tracking message is emitted according to a wave communication method.

* * * * *